No. 833,886. PATENTED OCT. 23, 1906.
H. W. LOCKE.
PLATE HOLDER ATTACHMENT FOR CAMERAS.
APPLICATION FILED FEB. 23, 1905.
3 SHEETS—SHEET 2.
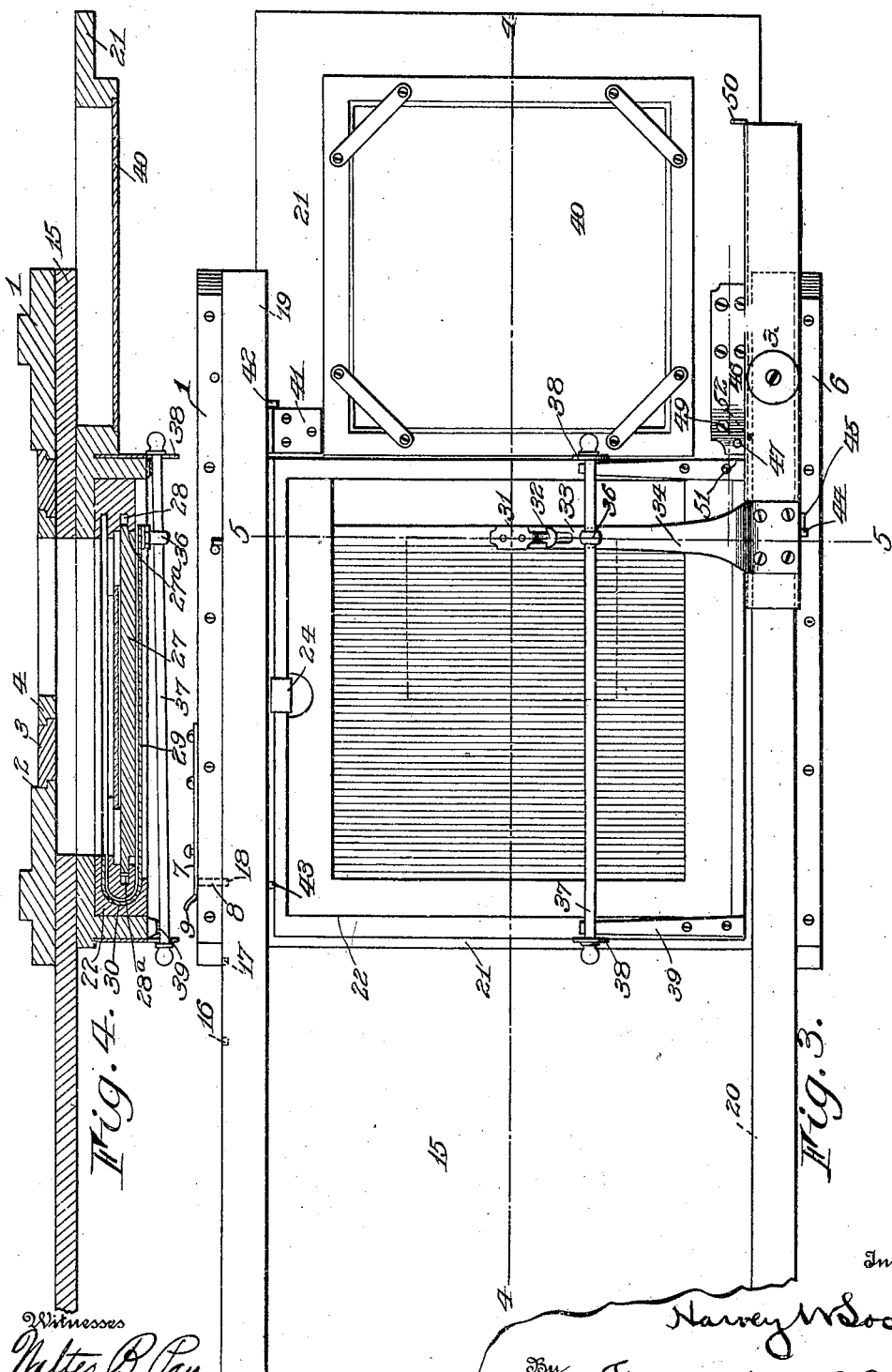

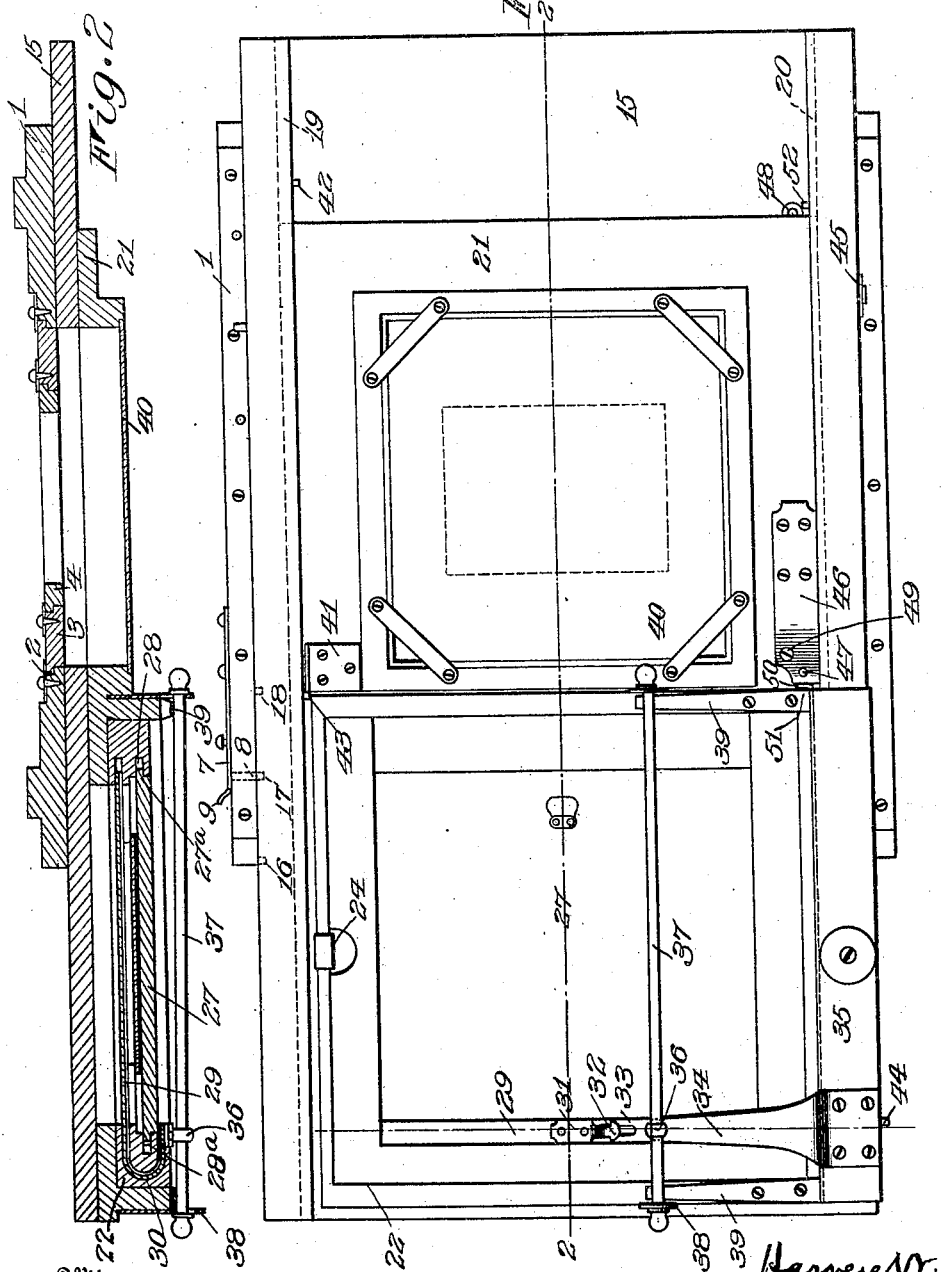

No. 833,886. PATENTED OCT. 23, 1906.
H. W. LOCKE.
PLATE HOLDER ATTACHMENT FOR CAMERAS.
APPLICATION FILED FEB. 23, 1905.
3 SHEETS—SHEET 3.
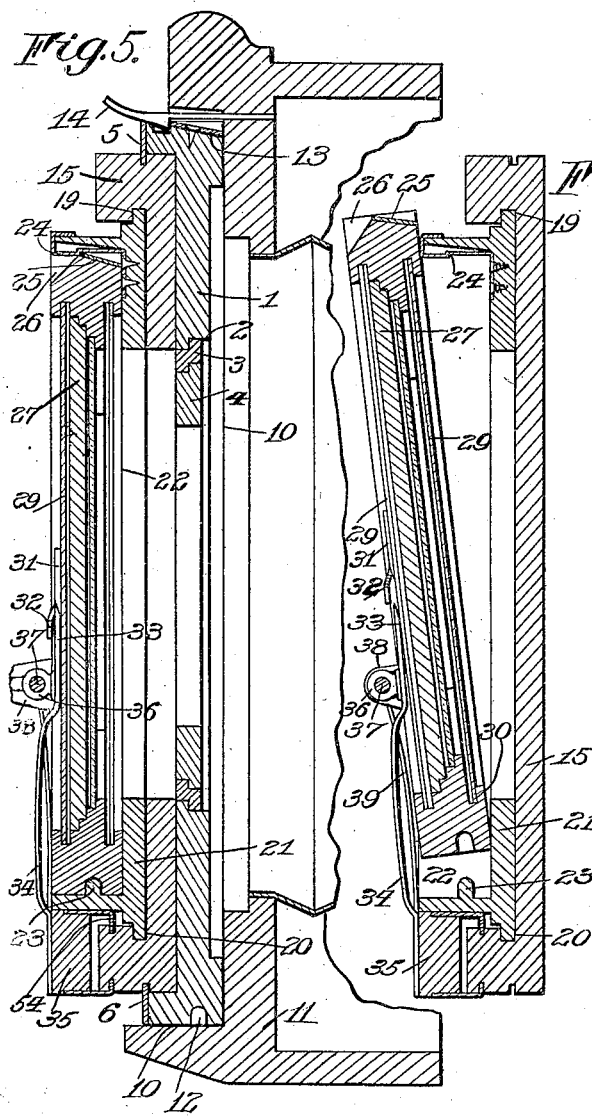
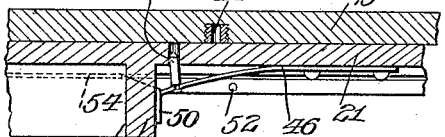
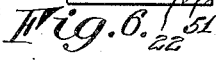
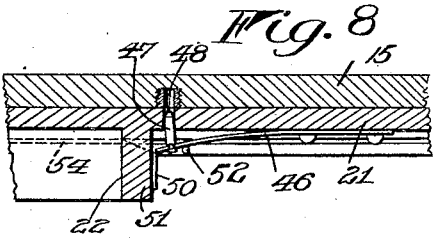
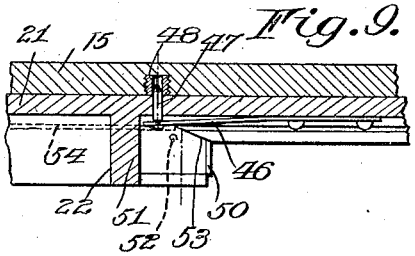
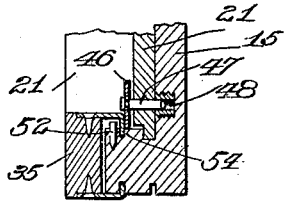

UNITED STATES PATENT OFFICE.

HARVEY W. LOCKE, OF ROCHESTER, NEW YORK, ASSIGNOR TO CENTURY CAMERA COMPANY, OF ROCHESTER, NEW YORK, A CORPORATION OF NEW YORK.

PLATE-HOLDER ATTACHMENT FOR CAMERAS.

No. 833,886.   Specification of Letters Patent.   Patented Oct. 23, 1906.

Application filed February 23, 1905. Serial No. 246,863.

*To all whom it may concern:*

Be it known that I, HARVEY W. LOCKE, of Rochester, in the county of Monroe and State of New York, have invented certain new and useful Improvements in Plate-Holder Attachments for Cameras; and I do hereby declare the following to be a full, clear, and exact description of the same, reference being had to the accompanying drawings, forming a part of this specification, and to the reference-numerals marked thereon.

My present invention relates to improvements in plate-holder attachments for cameras, particularly of the kind which permits one or more exposures to be made upon a single plate; and it is the purpose of my invention to provide an improved device of this character which enables the focusing-screen to be readily brought into operative position for the focusing operation and wherein a continuous motion of the operating member will bring the plate-holder into exposing position and the final movement will withdraw the curtain slide or shutter to expose the plate, the successive operations described being performed successively and automatically by a single continuous motion of the operator's hand, the parts being restored in the reverse order named when the parts are operated in reverse direction.

Furthermore, it is an object of my invention to provide improved devices for rendering the operation of the parts more perfect and to enable the attachment to be so adjusted that two or more exposures may be made upon each plate or different portions thereof.

To these and other ends the invention consists in certain improvements and combinations of parts, all as will be hereinafter more fully described, the novel features being pointed out in the claims at the end of the specification.

In the drawings, Figure 1 is a rear elevation of a plate-holder attachment constructed in accordance with my present invention, the plate-holder and ground-glass screen being shown in their normal positions for focusing. Fig. 2 is a horizontal sectional view of the same on the line 2 2 of Fig. 1. Fig. 3 is a view similar to Fig. 1, the slide carrying the plate-holder being shifted into exposing position. Fig. 4 is a horizontal sectional view on the line 4 4 of Fig. 3. Fig. 5 is a vertical sectional view on the line 5 5 of Fig. 3, showing the plate-holder in operative position with the curtain-slide withdrawn, the attachment being applied to the rear of the camera-box. Fig. 6 is a view similar to Fig. 5, showing the plate-holder and focusing-screen slide and its supporting-ways removed from the frame of the attachment, the plate-holder being partially removed from its corresponding receptacle on the slide; and Figs. 7 to 10, inclusive, are fragmentary sectional views of the contiguous parts of the slide and support, showing the device for locking the slide to its relatively fixed support while the plate-holder is in exposing position and for operatively connecting the operating member and the slide while the latter is in non-exposing positions.

A plate-holder attachment constructed in accordance with my invention which is capable of automatically bringing the plate-holder into exposing position and withdrawing the curtain-slide to expose the plate of the holder by a single continuous motion of the operator's hand in one direction and which is adjustable for producing exposures at either side of the plate in a convenient way embodies in its present form a frame 1, which is adapted to be fitted to the back or rear opening of the camera-box and is provided with the exposing-aperture 2, within which may be fitted the reducing-frames or kits 3 and 4, which are provided with apertures of given dimensions to enable exposures of smaller dimensions from those which would be produced by the large aperture 2 in the frame. This frame is provided with the transversely-arranged upper and lower ways 5 and 6, which extend horizontally, the upper ways being provided with a latch which embodies in its present form a resilient plate 7, which carries a plunger or detent 8, which extends beyond the ways when the plate 7 is in its normal position and which is capable of being withdrawn therefrom when the said plate is lifted or retracted by manipulation of the handle 9. This frame 1 is preferably so constructed that it may be readily applied to and removed from the camera, and for this purpose it is formed to enter a recess 10, which is provided in the camera-box 11, dowel-pins or projections 12 being preferably provided in the latter to coöperate with corresponding recesses in the frame for holding the lower part of the latter in position, the upper part of the frame being provided with a catch-plate 13, which coöperates with a spring-catch 14, which is carried by the camera-back and which is provided with an inclined projection which enables the frame to be moved into operative position and automatically locked therein, an extension of the spring-catch preferably projecting beyond the frame to provide a handle to enable the catch to be readily retracted to unlock the frame.

In the ways 5 and 6 of the frame 1 is the longitudinally-adjustable support 15, which is provided with notches 16, 17, and 18, which are arranged to coöperate with the locking-plunger 8, which is carried by the resilient plate 7, which is manipulated by the handle 9, and this support is provided with upper and lower guideways 19 and 20, in which the side 21 is slidably mounted. The support 15 and the slide 21 are each provided with exposure-apertures which are sufficiently large to register with the aperture 2 of the frame 1, and in the rear of the slide 21 is formed a plate-holder receptacle which embodies in the present instance a recess 22, the lower wall of which is preferably provided with a dowel-pin or rib 23, which is arranged to coöperate with corresponding recesses in the plate-holder, and at the top of this receptacle is provided a spring-catch 24, which automatically engages the inclined catch-plate 25 on the top of the plate-holder to lock the latter in operative position within the receptacle, a recess 26 being provided in the plate-holder to enable the finger to retract this spring-catch 24 to release the catch-plate 25, and thereby enable the plate-holder to be readily removed from its receptacle.

The plate-holder employed in the present instance embodies the usual frame, which is provided with a removable septum 27, which is fitted into a socket 28 in the frame and held in locked position by the action of the spring 28$^a$, which holds the shoulder 27$^a$ in operative position in the socket, operation of this septum against the action of the spring 28$^a$ allowing the shoulder 27$^a$ thereon to disengage from the corresponding shoulder of the socket, and this will permit the septum to be removed from the rear of the plate-holder.

Within the plate-holder frame is mounted a flexible curtain-slide 29, which may be of any desired construction and is movable in ways 30 to cover and uncover the plate which is carried by the plate-holder, the curtain-slide being provided at its rear extremity with a catch 31, which carries an enlarged offset head 32, which is adapted to coöperate with the forked members 33 of a resilient arm 34, the latter being carried upon the operating member 35, which is preferably mounted to slide longitudinally of the lower ways 20 of the support 15 entirely independently of the slide 21, that is supported by the ways 19 and 20. The resilient arm 34 has a normal tendency to spring rearwardly and is preferably provided with an eye 36, which is adapted to slide longitudinally on a guiding-rod 37, the latter being supported in horizontal slots in the brackets 38 of the slide 21 in such a manner that it is permitted to move through a limited distance forwardly and rearwardly relatively to the slide 21 under the action of the springs 39, and thus serves as a guard for limiting the lateral motion of the arm 34. This arm 34 will normally occupy a position similar to that shown in Fig. 1, and when the plate-holder is inserted in its receptacle the offset enlarged projection 32 of the curtain-slide will automatically establish operative connection with the forked members 33 of the arm 34, withdrawal of the plate-holder causing the curtain-slide and the arm 34 of the operating member 35 to be disengaged in the same manner. As the plate-holder is tilted while being placed within its corresponding receptacle in the movable slide 21 it will cause the resilient arm 34 and the guiding-rod 37 to be temporarily held in their rearmost positions, as shown in Fig. 6, and as the plate-holder is tilted forwardly, with the recesses in its lower edge coöperating with the dowel-pin or projection 23 and its upper edge is locked in position by the spring-catch 24, the resilient arm 34 will be bent forwardly, drawing the guiding-arm 37 forwardly against the action of the springs 39, and the elastic action of the arm 34 and the springs 39 will tend to partially remove the plate-holder from its corresponding receptacle immediately after the spring-catch 24 has been released, and this facilitates removal of the plate-holder and prevents immediate relocking when the catch 24 is released. Formed in the opposite end of the slide 21 is an aperture behind which is secured the focusing-screen or ground glass 40, which is adapted to be moved into and out of operative position behind the camera-lens by the relatively longitudinal motion of the slide 21 in its guideways 19 and 20, the motion of the slide 21 being limited in either direction by the projection 41 of the slide, which is arranged to coöperate with the stop 42 of the support 15 as the plate-holder is moved into exposing position and with the stop 43 when it is returned to place the focusing-screen 40 in position for focusing, the motion of the operating member 35 when it is being operated to withdraw the curtain-slide being limited by a projection 44 thereon, which coöperates with a stop 45 on the adjacent ways 20 of the support 15.

The locking device which I employ for automatically locking the slide 21 in exposing position and for operatively connecting the operating member 35 and the slide to cause these parts to move in unison when the slide is in non-exposing positions embodies in its present form a spring-plate 46, which is preferably carried by the slide 21, and the free end thereof, which is laterally movable, has a normal tendency to spring outwardly from the slide and is provided with a dog or plunger 47, which extends through the slide and is so arranged as to coöperate with the corresponding recessed locking member 48 when the slide 21 is in exposing position. In order to retain the free end of the spring 46 at a predetermined distance from the slide 21, I provide an adjusting-screw 49, the head of which bears against the spring 46, so that adjustment of this screw will vary the limit of motion of the spring laterally relatively to the slide 21, and as this screw passes loosely through the spring lateral motion of the latter may freely take place within predetermined limits. The adjacent end of the operating member 35 is provided with an upturned projection 50, which is arranged to coöperate with the corresponding projection 51, formed on the plate-holder slide 21 when the member 35 is operated in the proper direction to remove the plate-holder from exposing position and insert the ground-glass screen into position for focusing. While the slide 21 is in non-exposing position, the laterally-extending portion of the spring 46 will rest behind the adjacent edge of the projection 50, and it will be obvious that should the operating member 35 be manipulated to move the slide into exposing position the spring 46 will coöperate as an abutment with the projection 50, causing the motion of the member 35 to be transmitted to the slide 21.

On the support 15 adjacent to the locking member 48 is provided a stop 52, which is arranged to coöperate with the spring 46 as the slide 21 is moved into exposing position, causing the said spring to be disengaged from the projection 50 of the operating member 35. Continued motion of the operating member 35 will cause the inclined portion 53 of the member 35 to coöperate with the spring 46 to move the latter inwardly toward the slide 21, and consequently throwing the dog 47 into the locking member 48 of the support 15, which is normally locked by the plunger 7, and this spring 46 will be held in operated position by its engagement with the substantially straight guide 54, while the operating member 35 is withdrawing or replacing the flexible curtain-slide 29. When the operating member 35 is being returned to normal position and the projection 50 thereon is about to engage with the adjacent edge 51 of the slide 21, the spring 46 will be held in operated position to retain the dog 47 and the locking member 48 in coöperative engagement until the inclined portion 53 and the projection 50 of the operating member 35 have passed the free end of the spring, when the latter will move outwardly from the slide 21, disengaging the locking devices 47 and 48, its free end moving into coöperative engagement with the projection 50 of the operating member. However, it will be obvious that the members 47 and 48 will remain in coöperative relation to lock the slide 21 in exposing position until the operating member 35 has been completely operated to fully push the flexible curtain-slide over the sensitized plate in the plate-holder, and the moment the operation of the curtain-slide has been completed the members 47 and 48 will disengage, and thereby permit the slide 21 to be moved out of exposing position.

In obtaining photographic exposures upon the usual sensitized mediums by the use of a device of the character I have hereinbefore described the septum 27 is removed in the usual manner, and the sensitized plate or other medium which is to be exposed is properly positioned within the plate-holder frame and when the septum has been replaced and the curtain-slide occupies its normally closed position the plate-holder is inserted in its corresponding receptacle 22 of the carrier 21 in a manner shown in Fig. 5, the offset enlarged head 32 on the curtain-slide engaging behind the forked members 33 of the resilient arm 34 to form an operative connection between the curtain-slide and the actuating-frame 35, the spring-catch 24 coöperating with the catch-plate 25 to retain the plate-holder in proper position within its receptacle. The slide 21 and the actuating-frame 35 should occupy the relative positions shown in Fig. 1 at this time, and if it is desirable to produce a single exposure upon the center of the plate the latch of the frame 1 will be adjusted so that the plunger 8 thereof coöperates with the central notch 17 of the support 15, so as to lock the latter from moving within its ways relatively to the frame 1.

With the parts occupying the relative positions shown in Fig. 1 the ground-glass screen 40 will occupy a position in the focal plane of the camera-lens to enable an observation of the image during the usual focusing operation. With the plate-holder within the corresponding receptacle on the slide 21 the operating member 35 is moved toward the right, and through the coöperative relation of the projection 50 thereon and the spring 46 of the slide 21 the latter will be moved in unison with the member 35, causing the screen 40, which is carried by the slide, to be displaced and the plate-holder to be brought into operative position in the focal plane of the camera-lens, the projection 41 of the slide coöperating with the stop 42 on the support 15 to arrest the motion of the slide 21 when the plate-holder has reached the exposing position. At this moment, or during an interval immediately preceding the engagement of the members 41 and 42, the stop 52 will coöperate with the laterally-yielding spring 46, causing the latter to be moved inwardly toward the slide 21, upon which it is carried, and this will cause its free end to be disengaged from the corresponding projection 50 of the operating member 35, and as continued motion is imparted to this member the inclined portion 53 thereon will cause the spring 46 to be moved inwardly sufficiently far to engage the locking members 47 and 48 to prevent motion of the slide 21 in either direction, and after this has occurred the motion of the member 35 operating through the arm 34 and the catch members 32 and 33 will cause the flexible curtain-slide 29 to be withdrawn to uncover and expose the sensitized plate which is carried by the plate-holder. When the required exposure has been accomplished through the manipulation of the camera-shutter or other parts in the usual way, the motion of the member 35 is reversed, causing the curtain-slide 29 to be returned into the plate-holder to cover the sensitized plate therein, the spring 46 being held in operated position to retain the members 47 and 48 in locked engagement by coöperating with the guide 54 of the operating member until the curtain-slide has been completely returned to normally closed position, and when this has occurred and the projection 50 of the operating member has passed the free end of the spring 46 and engages the corresponding edge of the slide the members 47 and 48 will be disengaged by the resilient or elastic action of the spring 46 and continued motion of the operating member 35 will cause the slide 21 to be moved out of exposing position and the ground-glass screen 40 to be brought into operative position behind the camera-lens, the return motion of the slide 21 being limited by the coöperative engagement of the members 41 and 43.

When it is desirable to produce a number of exposures upon different portions of the sensitized plate, the support 15 is adjusted longitudinally within the frame 1 by releasing the spring 7 and moving the support until the plunger 8 coöperates with the notch 18 of the support, and this will offset the support 15 relatively to the camera and the frame 1, which is carried thereby. The operating member 35 is moved in a manner similar to that described in making exposures in the center of the plate, it being obvious that the motion of the slide 21 will be arrested while the exposing-aperture of the frame 1 is opposite to one side of the plate at the first operation, and when the member 35 has been operated to draw the curtain-slide and the exposure upon one side of the plate has been completed the spring 7 may be lifted before the operating member 35 is again operated, and this will permit the support 15 to be shifted until the plunger rests in the notch 16, and this will bring the remaining portion of the plate into position for the next exposure, similar additional notches being provided, if desired, should it be desirable to produce four or more exposures upon the same plate.

A plate-holder attachment embodying my invention enables the photographic exposures to be made conveniently and with certainty, for it will be obvious that as the support 15, which is adjustable in a direction transversely of the camera, is positively locked in the central position when a single exposure is to be made in the central portion of the plate and it is locked in the offset positions at either side of the central position when it is desirable to obtain exposures successively upon different portions of the same plate without the necessity of removing the latter from the camera, and as the slide carrying the plate-holder and screen always operates between certain fixed stops on the adjustable support 15 the desired portion of the plate is always accurately positioned relatively to the camera-lens, whether the support 15 occupies a central or offset position. By using the automatic device for locking the slide in exposing position and for operatively connecting the operating member and the slide to cause these parts to move in unison at all times, except when the slide is in exposing position, the curtain-slide, which permits access of light to the sensitized plate, will be drawn only after the slide carrying the plate-holder has been drawn completely into proper exposing position, and this prevents premature exposing of the plate. Moreover, in adjusting the support 15 to enable two or more exposures to be made upon different portions of the same plate the slide is automatically arrested when it reaches the first exposing position, and the support 15 is released and shifted, so as to carry the slide into the next exposing position, and as the curtain-slide is completely withdrawn previous to the first exposure and the successive positions of the slide are produced by operations of the parts by motion of the operator's hand in one direction only there is no possibility of inadvertently closing the curtain-slide, either partially or wholly, while the operator's attention is required in positioning the plate-holder.

The improved device which I employ for establishing operative connection between the operating member and the slide and for locking the latter in exposing position is also simple in construction, yet capable of operating reliably, and as it does not require the attention of the operator in manipulating the plate-holder and curtain-slides operation of the device is facilitated.

I claim as my invention—

1. In a plate-holder attachment for photographic cameras, the combination with the camera-back, of a support adjustable transversely of the camera-back and having ways formed thereon, and a slide mounted to operate in said ways within given limits and carrying a plate-holder.

2. In a plate-holder attachment for cameras, the combination with the camera-box having ways extending transversely thereof, of a support adjustable longitudinally in said ways, and a slide mounted to operate longitudinally between predetermined limits on the adjustable support and carrying a plate-holder.

3. In a plate-holder attachment for cameras, the combination with the camera-box, of a support adjustable in a direction transversely of the camera, a catch for securing the support in different positions of adjustment relatively to the camera, and a slide movable longitudinally of the support and carrying a plate-holder.

4. The combination with a camera having a frame attached thereto provided with ways extending transversely of the camera, and a catch mounted on the frame, of a support adjustable in the ways of the frame and having notches arranged to coöperate with the catch for locking the support in different positions of adjustment in a direction transversely of the camera, and a slide mounted to operate between fixed stops on the support and carrying a plate-holder and a focusing-screen.

5. The combination with a camera and a support attached thereto and provided with ways extending transversely of the camera, of a slide mounted to operate in said ways and carrying a plate-holder, an operating member, a device for locking the slide in exposing position and forming an operative connection between the operating member and the slide while the latter is in non-exposing positions, and means for automatically disconnecting the operating member and the slide and locking the latter in exposing position, and for unlocking the slide automatically by the reverse motion of the operating member.

6. The combination with a camera, a support adjustable transversely thereof and having ways formed thereon, and a device for locking the support in different positions of adjustment transversely of the camera, of a slide mounted to operate in the ways of the support and carrying a plate-holder and a locking device for locking the slide in a predetermined position relatively to the support at different positions of adjustment of the latter in a direction transversely of the camera.

7. The combination with a camera having ways extending transversely thereof, a support adjustable in said ways, and a catch for retaining the support in different adjusted positions relatively to the camera, of a slide movable longitudinally of the support and carrying a plate-holder and a focusing-screen, a curtain-slide for the plate-holder, an operating member operatively connected to the plate-holder and curtain-slides, and means for locking the plate-holder slide in a predetermined position on the support and for disconnecting the slide and the operating member to permit a continued motion of the latter to draw the curtain-slide of the plate-holder.

8. The combination with a camera provided with a support having ways extending transversely of the camera, of a slide mounted to operate in said ways and carrying a plate-holder and a focusing-screen adapted to be moved into exposing and non-exposing positions, and a device for locking the slide and support in fixed relation embodying a spring-operated arm having a dog arranged to coöperate with a corresponding locking member, and a stop arranged in the path of the said arm for causing the engagement of the said dog and locking member when the slide is moved into exposing position.

9. The combination with a camera provided with a support having ways extending transversely of the camera, of a slide mounted to operate in said ways and carrying a plate-holder and a focusing-screen, adapted to be moved into exposing and non-exposing positions, a laterally-movable spring carried by the slide having a locking-dog thereon arranged to coöperate with a corresponding locking member on the support when the slide is in exposing position, and a relatively fixed stop arranged to control the operation of the said spring as the slide is moved into and out of exposing position.

10. The combination with a camera provided with a support having ways extending transversely of the camera, of a slide mounted to operate in said ways and carrying a plate-holder and a focusing-screen, a locking-dog mounted on the slide and adapted to coöperate with a recessed locking member on the support to lock the latter and the slide in fixed relation and a relatively fixed stop arranged to operate the dog to engage and disengage the locking member of the support as the slide is operated.

11. The combination with a camera provided with a support having ways extending transversely of the camera, of a slide mounted to operate in said ways and carrying a plate-holder and a focusing-screen, a curtain-slide in the plate-holder, an operating member for operating the plate-holder and curtain-slides, a device carried by the plate-holder slide embodying a laterally-movable spring having a dog arranged to coöperate with a corresponding locking member on the support, and having a portion arranged to coöperate with the operating member when the said dog and locking member are disengaged, and a guide on the operating member for retaining the dog and locking member in engagement.

12. The combination with a camera provided with a support having ways extending transversely of the camera, of a slide mounted to operate in said ways and carrying a plate-holder and a focusing-screen, an operating member having a projection arranged to engage the plate-holder slide to move it in one direction, a curtain-slide for the plate-holder operatively connected to the operating member, a locking device carried by the plate-holder and focusing-screen slide for locking the latter and the support, said device being arranged to engage the projection of the operating member to form an operative connection between the latter and the slide for the plate-holder and the focusing-screen, and means on the operating member for moving the locking device into locked position and for retaining it in such a position while the said member is being moved to operate the curtain-slide.

13. The combination with a camera provided with a support having ways extending transversely thereof, of a slide mounted to operate in said ways and having a plate-holder receptacle formed therein provided with projections extending inwardly from one of the walls thereof, a plate-holder adapted to enter the receptacle and having corresponding recesses to receive the projections, devices operating to remove the holder from its receptacle, and a catch for locking the plate-holder within the receptacle.

14. The combination with a camera provided with a support having ways extending transversely thereof, of a slide mounted to operate in said ways and having a plate-holder receptacle formed therein provided with a projection in one of its walls, a plate-holder adapted to enter the receptacle and having a corresponding recess to coöperate with the said projection, a spring normally operating to remove the plate-holder from the receptacle, and a catch for locking the plate-holder in position within its receptacle.

15. The combination with a camera provided with a support having ways extending transversely of the camera, of a slide mounted to operate in said ways having a receptacle formed therein, a plate-holder adapted to fit in the receptacle of the slide and having a curtain-slide arranged therein, an operating member for operating the said slides and having an attaching-arm adapted to form operative connection with the curtain-slide, and a guard having a sliding connection with the attaching-arm of the operating member.

HARVEY W. LOCKE.

Witnesses:
CLARENCE A. BATEMAN,
RUSSELL B. GRIFFITH.